US009342696B2

(12) United States Patent
Imtiaz et al.

(10) Patent No.: US 9,342,696 B2
(45) Date of Patent: *May 17, 2016

(54) ATTESTING USE OF AN INTERACTIVE COMPONENT DURING A BOOT PROCESS (75) Inventors: Imran Imtiaz, Manchester (GB); David Nigel Mackintosh, Manchester (GB); James William Walker, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/820,039

(22) PCT Filed: Aug. 31, 2011

(86) PCT No.: PCT/EP2011/064979
§ 371 (c)(1),
(2), (4) Date: Apr. 15, 2013

(87) PCT Pub. No.: WO2012/038211
PCT Pub. Date: Mar. 29, 2012

(65) Prior Publication Data
US 2013/0212369 A1    Aug. 15, 2013

(30) Foreign Application Priority Data
Sep. 22, 2010   (EP) .................................. 10178162

(51) Int. Cl.
*G06F 11/30*        (2006.01)
*G06F 12/14*        (2006.01)
*G06F 21/57*        (2013.01)

(52) U.S. Cl.
CPC .............. *G06F 21/575* (2013.01); *G06F 21/57* (2013.01)

(58) Field of Classification Search
CPC ..................................................... H04L 49/506
USPC ........................................ 726/22, 30; 711/130
See application file for complete search history.

(56) References Cited

U.S. PATENT DOCUMENTS 5,511,191 A   4/1996  de Leeuw van Weenen et al.
6,539,480 B1  3/2003  Drews (Continued)

FOREIGN PATENT DOCUMENTS

CN    1703014 A    11/2005
CN    1954288 A    4/2007

(Continued)

OTHER PUBLICATIONS

TCG Specification Architecture Overview (Revision 1.4, $2^{nd}$ Edition Aug. 2007).*

(Continued)

*Primary Examiner* — Morshed Mehedi
*Assistant Examiner* — Khalil Naghdali
(74) *Attorney, Agent, or Firm* — Roy W. Truelson; James R. Nock (57) ABSTRACT A method for attesting use of an interactive component during a boot process, comprising the steps of: reading, in response to determining use of the interactive component, associated interactive input; determining whether the input should be trusted; and in response to determining that the input should be trusted, processing the input to create a trusted cryptographic value, further comprising: matching, in response to a subsequent interactive input being read, the subsequent interactive input with one or more of the trusted cryptographic values in order to determine whether the subsequent interactive input is trusted.

9 Claims, 6 Drawing Sheets

(56) References Cited

U.S. PATENT DOCUMENTS

| | | | |
|---|---|---|---|
| 6,546,392 B1 | 4/2003 | Bahlmann | |
| 7,191,464 B2 | 3/2007 | Cromer et al. | |
| 7,222,062 B2* | 5/2007 | Goud et al. | 703/23 |
| 7,275,263 B2 | 9/2007 | Bajikar et al. | |
| 7,313,679 B2 | 12/2007 | Ranganathan | |
| 7,380,119 B2 | 5/2008 | Bade et al. | |
| 7,480,804 B2* | 1/2009 | Bade et al. | 713/181 |
| 7,571,312 B2 | 8/2009 | Scarlata et al. | |
| 7,613,921 B2 | 11/2009 | Scaralata | |
| 7,716,494 B2 | 5/2010 | Liu et al. | |
| 7,840,801 B2 | 11/2010 | Berger et al. | |
| 7,921,286 B2 | 4/2011 | Wooten | |
| 7,953,778 B2 | 5/2011 | McKenney et al. | |
| 8,032,741 B2 | 10/2011 | Smith | |
| 8,042,190 B2* | 10/2011 | Sahita et al. | 726/27 |
| 8,060,934 B2 | 11/2011 | Cabuk et al. | |
| 8,074,262 B2 | 12/2011 | Scarlata | |
| 8,151,262 B2* | 4/2012 | Challener et al. | 718/1 |
| 8,201,216 B2 | 6/2012 | Cha et al. | |
| 8,433,924 B2 | 4/2013 | Challener et al. | |
| 8,499,161 B2 | 7/2013 | Cha et al. | |
| 8,522,018 B2* | 8/2013 | Molina et al. | 713/168 |
| 8,549,288 B2* | 10/2013 | Bade et al. | 713/166 |
| 8,738,932 B2 | 5/2014 | Lee et al. | |
| 2002/0194482 A1 | 12/2002 | Griffin et al. | |
| 2003/0084285 A1 | 5/2003 | Cromer et al. | |
| 2004/0205362 A1 | 10/2004 | Catherman et al. | |
| 2005/0039013 A1* | 2/2005 | Bajikar et al. | 713/172 |
| 2005/0108564 A1 | 5/2005 | Freeman et al. | |
| 2005/0138161 A1 | 6/2005 | McDaniel et al. | |
| 2006/0136708 A1 | 6/2006 | Hajji et al. | |
| 2008/0046581 A1 | 2/2008 | Molina et al. | |
| 2008/0104382 A1 | 5/2008 | Tarkkala | |
| 2008/0178176 A1 | 7/2008 | Berger et al. | |
| 2008/0183767 A1 | 7/2008 | Zhu et al. | |
| 2008/0229097 A1 | 9/2008 | Bangerter et al. | |
| 2008/0235372 A1 | 9/2008 | Sailer et al. | |
| 2008/0235754 A1 | 9/2008 | Wiseman et al. | |
| 2008/0244569 A1 | 10/2008 | Challener et al. | |
| 2008/0244746 A1 | 10/2008 | Rozas et al. | |
| 2008/0256595 A1 | 10/2008 | Schunter et al. | |
| 2008/0281654 A1 | 11/2008 | Carter et al. | |
| 2008/0282348 A1 | 11/2008 | Proudler et al. | |
| 2009/0013406 A1* | 1/2009 | Cabuk et al. | 726/22 |
| 2009/0070573 A1 | 3/2009 | Ebringer et al. | |
| 2009/0125352 A1 | 5/2009 | Miyake et al. | |
| 2009/0125716 A1 | 5/2009 | Wooten | |
| 2009/0169017 A1 | 7/2009 | Smith et al. | |
| 2009/0204964 A1 | 8/2009 | Foley et al. | |
| 2009/0328022 A1 | 12/2009 | Brogan et al. | |
| 2010/0083002 A1 | 4/2010 | Cui et al. | |
| 2010/0161998 A1* | 6/2010 | Chen et al. | 713/189 |
| 2010/0281273 A1 | 11/2010 | Lee et al. | |
| 2010/0325628 A1 | 12/2010 | Haga | |
| 2012/0011352 A1 | 1/2012 | Shimatani | |
| 2012/0084549 A1 | 4/2012 | Mackintosh et al. | |
| 2012/0131334 A1 | 5/2012 | Haikney et al. | |
| 2012/0216255 A1 | 8/2012 | Haikney et al. | |
| 2013/0080756 A1 | 3/2013 | Mackintosh et al. | |
| 2013/0212369 A1 | 8/2013 | Imtiaz et al. | |
| 2013/0305364 A1 | 11/2013 | Haikney et al. | |
| 2014/0025961 A1 | 1/2014 | Mackintosh et al. | |
| 2014/0033210 A1 | 1/2014 | Haikney et al. | |
| 2015/0007313 A1 | 1/2015 | Mackintosh et al. | |

FOREIGN PATENT DOCUMENTS

| | | |
|---|---|---|
| CN | 101044489 A | 9/2007 |
| EP | 1980970 A2 | 10/2008 |
| JP | 2010511209 A | 4/2010 |
| WO | 2012038211 A1 | 3/2012 |

OTHER PUBLICATIONS

"TCG Specification Architecture Overview," Specification Revision 1.4, Aug. 2007, 54 pages.

Wenjuan Xu et al., "DR@FT: Efficient Remote Attestation Framework for Dynamic Systems," Sep. 20, 2010, Computer Security A Esorics 2010, Springer Berlin Heidelberg, pp. 182-198.

Li Shang Jie et al., "A Privacy-Preserving Integrity Measurement Architecture," 2010 Third International Symposium on Electronic Commerce and Security (ISECS), IEEE, Piscataway, NJ, USA, Jul. 29, 2010, pates 242-246.

Chun, Brent N. et al., "Decentralized Trust Management and Accountability in Federated Systems", Proceedings of the 37th Annual Hawaii International Conference on Systems Sciences, Jan. 2004, 9 pages.

Griffin, John Linwood et al., "Trusted Virtual Domains: Toward Secure Distributed Services", Proceedings of the First Workshop on Hot Topics in System Dependability, Jun. 2005, 6 pages.

Mackintosh, David et al., "Attesting a Component of a System During a Boot Process", U.S. Appl. No. 13/459,164, filed Apr. 28, 2012, 25 pages.

"TCG Infrastructure Working Group Architecture Part II—Integrity Management", Specification Version 1.0, Revision 1.0, Nov. 2006, 4 pages.

Haikney, et al., "Techniques for Attesting Data Processing Systems," U.S. Appl. No. 13/988,051, and Preliminary Amendment, filed Jul. 29, 2013, 44 pages.

Haikney, et al., "Techniques for Attesting Data Processing Systems," U.S. Appl. No. 14/042,267, filed Sep. 30, 2013, 32 pages.

Final Office Action, dated Sep. 27, 2013, regarding U.S. Appl. No. 13/459,164, 31 pages.

Final Office Action, dated Oct. 22, 2013, regarding U.S. Appl. No. 13/289,044, 23 pages.

Office Action, dated Jan. 9, 2014, regarding U.S. Appl. No. 13/241,835, 24 pages.

Notice of Allowance, dated Jun. 16, 2014, regarding U.S. Appl. No. 13/241,835, 11 pages.

B. Kauer, "OSLO-Open Secure LOader", (README file published on-line, publication date unknown, believed published Jun. 14, 2010 or earlier).

B Kauer, "OSLO: Improving the security of Trusted Computing" (Presented at 16 USENIX Security Symposium, Aug. 6-10, 2007).

International Business Machines Corporation, "List of IBM Patents or Patent Applications Treated as Related", filed in USPTO in present application Dec. 20, 2015.

\* cited by examiner

FIG. 1

Prior Art

FIG. 2

Prior Art

ATTESTING USE OF AN INTERACTIVE COMPONENT DURING A BOOT PROCESS

FIELD OF THE INVENTION

The present invention relates to a method for attesting use of an interactive component during a boot process.

BACKGROUND OF THE INVENTION

Trusted boot is a process for booting and establishing a chain of trust in a computing system. With reference to the environment (100) of FIG. 1, for example, a system administrator takes delivery of a server (a managed system (120)) and proceeds to install system software. The managed system (120) comprises a secure device (125), e.g. a TPM (Trusted Platform Module). Once the system (120) is configured and booting, each component (hardware and/or software) of the managed system (120) cryptographically measures another component and can "extend" (but not directly write to) a measurement value into a Platform Configuration Register (PCR) of the TPM (125). Each component is also operable to access an event log in order to write data associated with the measurement of a component into an entry associated with the event log.

Figure 1:
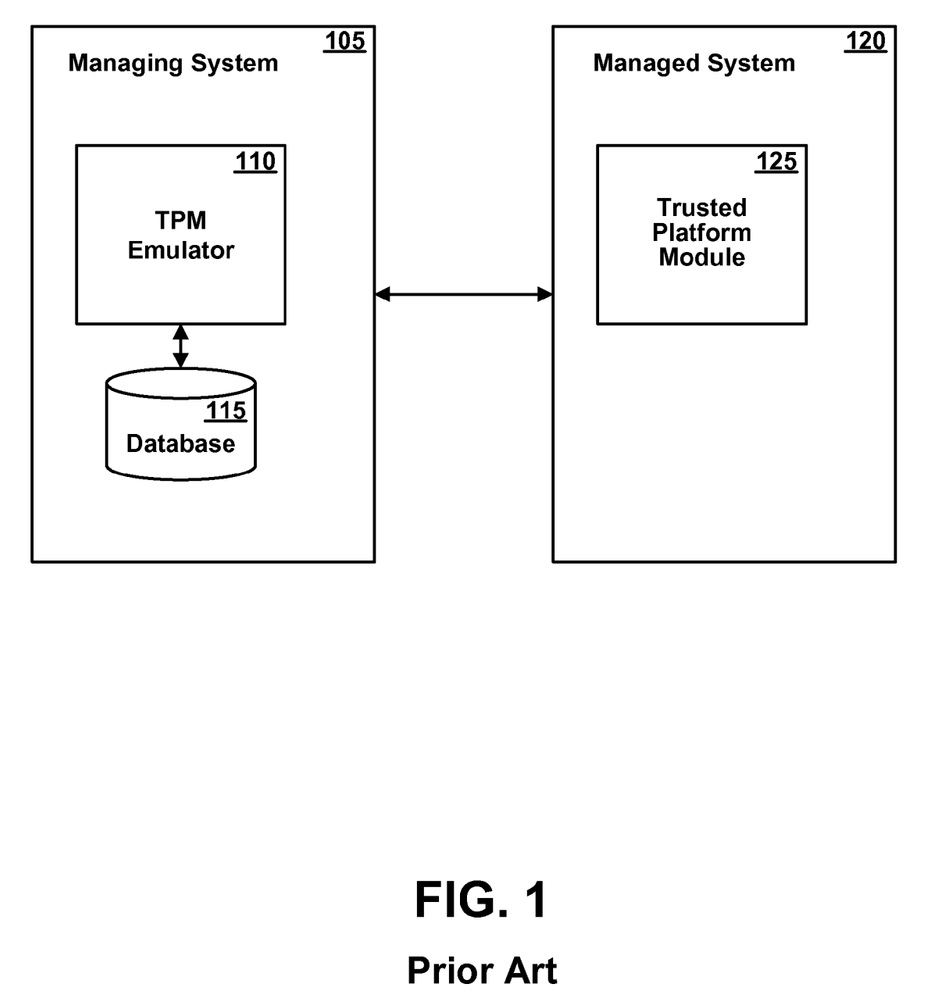
FIG. 1 is a block diagram showing a known system for carrying out trusted boot and remote attestation processes.

The administrator trusts the configuration and takes these initial measurements as trusted. The assumption is that no one has subverted the system after the install/configuration and before the measurements were recorded.

The measurements can be remotely attested by a managing system (105) which has a database (115) to store expected attestation values for components of each managed system. The values would typically be stored along with some metadata describing what the values mean. The managing system (105) comprises a TPM emulator (110) for e.g., comparing the measurements with the values. The remote attestation process itself may be initiated by either the managing or managed system.

Changes to the managed system (120) can be detected by subsequent trusted boot and remote attestation processes.

The above processes are described, for example, in section 4 of the Trusted Computing Group (TCG) Specification Architecture Overview; Specification; Revision 1.4; 2 Aug. 2007 and section 2 of the TCG Infrastructure Working group Architecture Part II—Integrity Management; Specification Version 1.0; Revision 1.0; 17 Nov. 2006.

The trusted boot process and remote attestation process described above work well when the boot process is well defined, for example, in a games console which has a simple non-interactive boot process. In more advanced computing systems, for example, a POWER (POWER is a registered trademark of International Business Machined Corporation) server, the boot process can be complicated by the optional involvement of an interactive component, whereby low-level firmware can be diverted to an interactive component. In many server systems, the interactive component typically comprises an OF (Open Firmware) prompt and in Intel (Intel, Intel logo, Intel Inside, Intel Inside logo, Intel Centrino, Intel Centrino logo, Celeron, Intel Xeon, Intel SpeedStep, Itanium, and Pentium are trademarks or registered trademarks of Intel Corporation or its subsidiaries in the United States and other countries) systems, the interactive component typically comprises an EFI (Extensible Firmware Interface) prompt. An interactive component is not unique to a physical system—virtual machines may also have interactive components.

For example, a user of the system can have the option, when booting, to input to an interactive component, for example, by pressing a function key. The interactive component is typically presented as a command prompt or a menu and can allow a user to change settings and run code before control is transferred to the next measured boot component. Use of the interactive component can be for legitimate administrative uses, for example, an administrator can use the interactive component and perform tasks e.g., running pre-defined commands to perform system configuration and diagnosis; inputting code which will be executed. Thus, a generic decision that use of the interactive component should be deemed untrusted does not work well in practice. However, the use of the interactive component is open to malicious attack e.g., typically, memory can be read from and written to the interactive component and it is even possible to re-write memory where the firmware resides.

Note that securing the trusted boot process is especially important in certain environments e.g., in a cloud computing environment whereby an application, for example, a banking application, (and an associated virtual machine) can be migrated to shared resources within the cloud. A trusted boot process can be applied to shared resources in addition to being used by virtual machines.

SUMMARY OF THE INVENTION

Note that the trusted boot process works well for a given system that changes rarely if at all and one where each component follows a strict path of execution wherein any changes to a component (such as an operating system) is accompanied by a trusted value of a measurement of the changed component from the owner of the component (e.g., a corporation producing an update to an operating system will also provide one or more trusted values associated with the update). This allows a database of trusted values of measurements for various components (and thus e.g., entire systems) to be generated ahead of time. Any component of a managed system must therefore match existing entries associated with trusted values of measurements or else they are implicitly untrustworthy.

An embodiment discloses a solution that allows use of an interactive component during the trusted boot process to be detected and to determine whether actions performed during use of the interactive component are trusted.

An embodiment addresses the fact that even with unchanging boot components, there may be an interactive component (such as a command prompt) that could allow a malicious user to compromise the system. The preferred embodiment provides a mechanism to record the actions of a user during use of the interactive component by using an assigned PCR which is treated specially by the managing system. In effect, the assigned PCR is considered more volatile than other PCRs and may take on any of a number of trusted values. Advantageously, even if a measurement value associated with a component does not match a trusted value, the input associated with the measurement value may well be associated with a new trusted input which can be accepted and recorded for future reference.

According to a first aspect, there is provided a method for attesting use of an interactive component during a boot process, comprising the steps of: reading, in response to determining use of the interactive component, associated interactive input; determining whether the input should be trusted; and in response to determining that the input should be trusted, processing the input to create a trusted cryptographic value, further comprising: matching, in response to a subsequent interactive input being read, the subsequent interactive input with one or more of the trusted cryptographic values in order to determine whether the subsequent interactive input is trusted.

According to a second aspect, there is provided an apparatus for attesting use of an interactive component during a boot process, comprising: means, responsive to determining use of the interactive component, for reading associated interactive input; means for determining whether the input should be trusted; and means, responsive to determining that the input should be trusted, for processing the input to create a trusted cryptographic value, further comprising: means, responsive to a subsequent interactive input being read, for matching the subsequent interactive input with one or more of the trusted cryptographic values in order to determine whether the subsequent interactive input is trusted.

According to a third aspect, there is provided a computer program comprising computer program code stored on a computer readable medium to, when loaded into a computer system and executed thereon, cause said computer system to perform all the steps of the method above.

BRIEF DESCRIPTION OF THE DRAWINGS

The present invention will now be described, by way of example only, with reference to embodiments thereof, as illustrated in the following drawings.

DETAILED DESCRIPTION

A more detailed explanation of known trusted boot and remote attestation processes will now be given.

Figure 2:
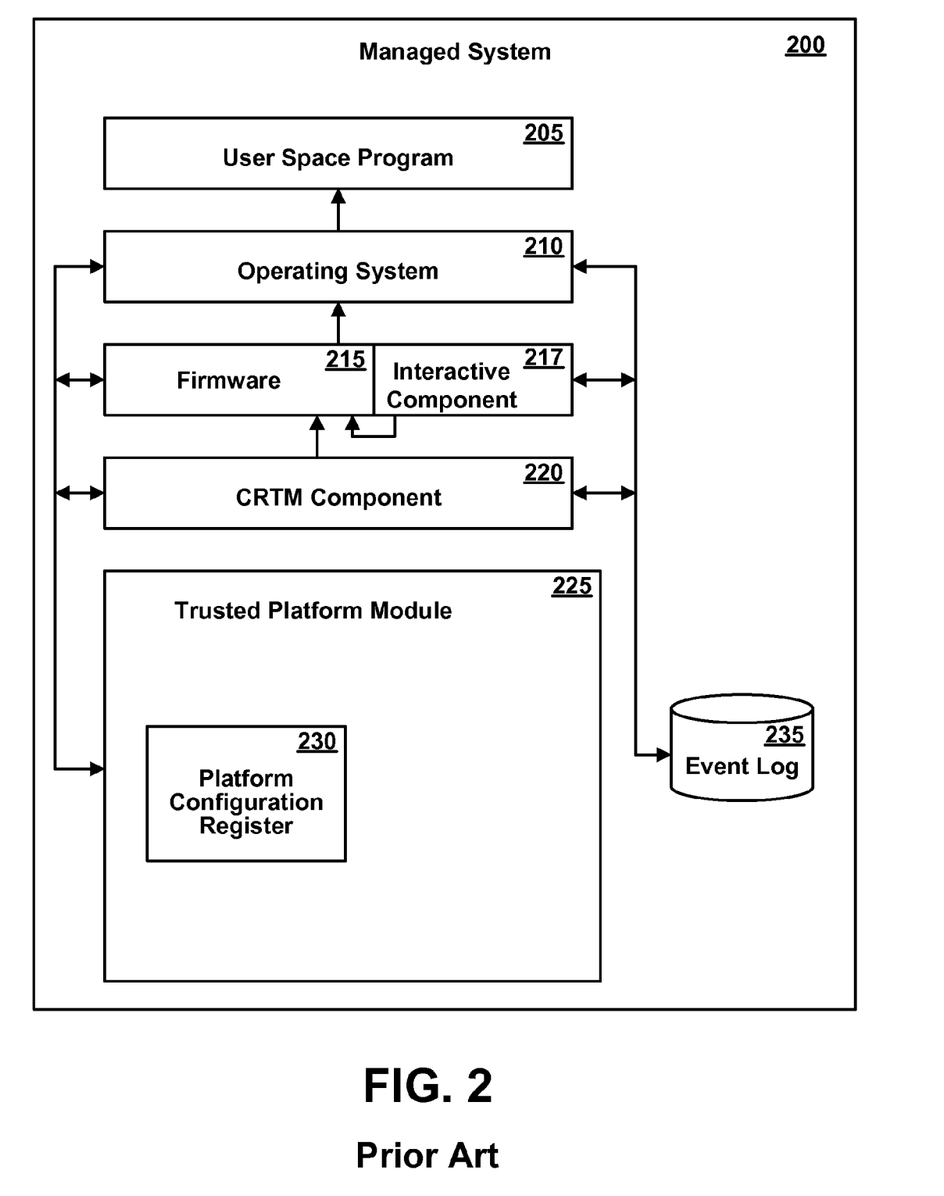
FIG. 2 is a block diagram showing the components of a known managed system.

With reference to FIG. 2, there is shown a managed system (200) in more detail. During a trusted boot process, each component of the managed system (200) cryptographically measures (e.g., using Secure Hash Algorithm (SHA) to create a hash of information such as a software file; a model; make; serial number of a component etc. in order to create a measurement value) another boot component.

In an example, a Core Root of Trust for Measurement (CRTM) component (220), for example, BIOS, is the first piece of code which is given control during boot and must be implicitly trusted as it is immutable. The CRTM (220) cryptographically measures the next component in the boot process (e.g., firmware (215)); subsequently the firmware (215) measures the next component in the boot process (e.g., an operating system (210)); and subsequently the operating system (210) measures any user space programs (205) before control is transferred to the user space program (205).

Each component can "extend" (but not directly write to) a measurement value into a Platform Configuration Register (PCR) (230) of a TPM (225) before control is transferred to the measured component. An extend operation comprises a cryptographic combination of a value of the PCR and a measurement value.

Each component is also operable to access an event log (235) in order to write data associated with the measurement of a component (e.g., metadata such as a component identifier and an event; and an associated measurement value) into an entry associated with the event log (235).

Note that the CRTM (220) executes in a restricted environment where it can not typically access the event log (235). Note also that although a user space program (205) is operable to use the TPM (225) and the event log (235), it is optional as to whether it does so since the user space program (205) does not tend to load other software components itself.

Note that if an interactive component (such as a command prompt or a menu) (217) is available, control will remain with the firmware (215) for an indefinite period of time before being transferred to the operating system (210).

Figure 3:
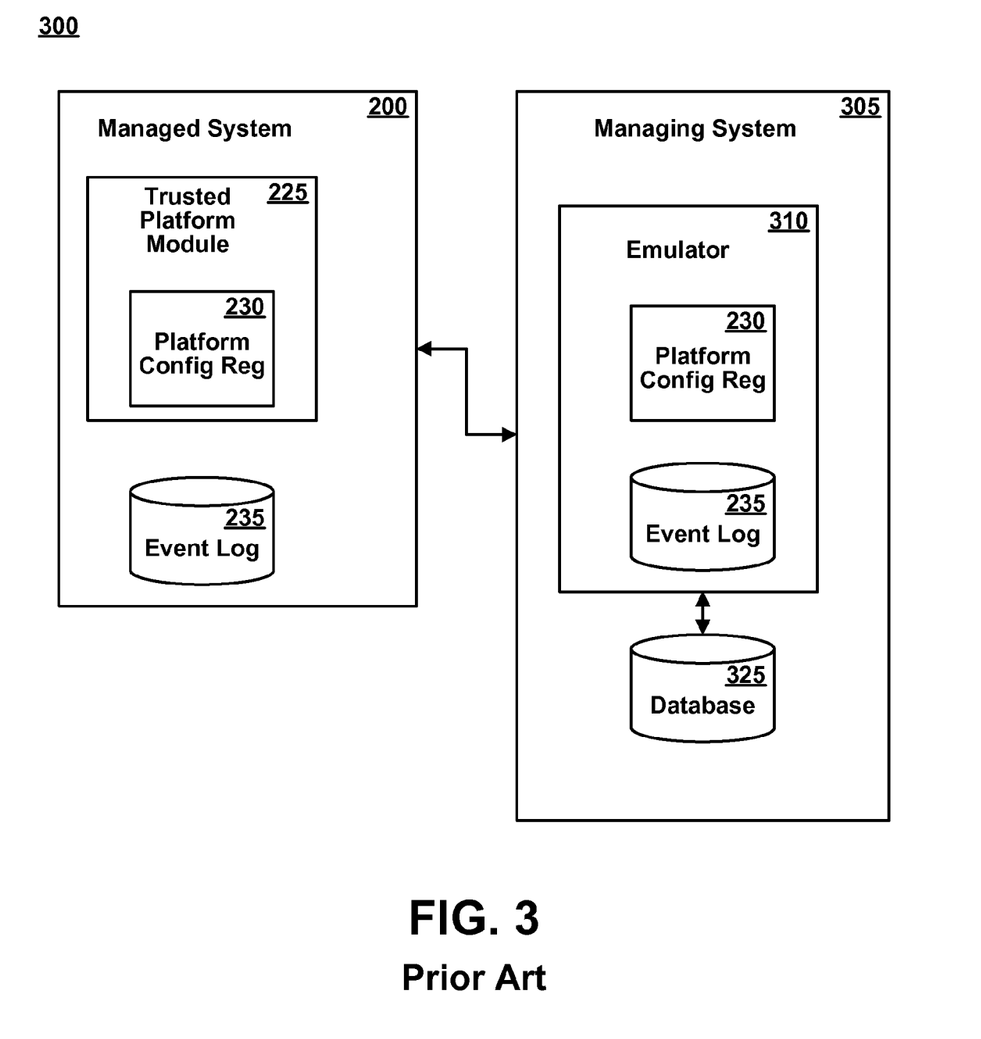
FIG. 3 is a block diagram showing a more detailed view of a known system for carrying out trusted boot and remote attestation processes.

Once the managed system (200) is running, data associated with a "chain of trust" can be extracted for inspection by a remote system (305) using a remote attestation procedure e.g. DAA (Direct Anonymous Attestation) as will be described herein.

With reference to the system (300) of FIG. 3, there is shown the managed system (200) and associated TPM (225); PCRs (230); and event log (235) comprising one or more measurement values and associated metadata. An attestation process typically involves the managed system (200) sending the current PCR values (230) (i.e., resulting from an extend operation) for measured components together with the event log (235) to a managing system (305).

Figure 4:
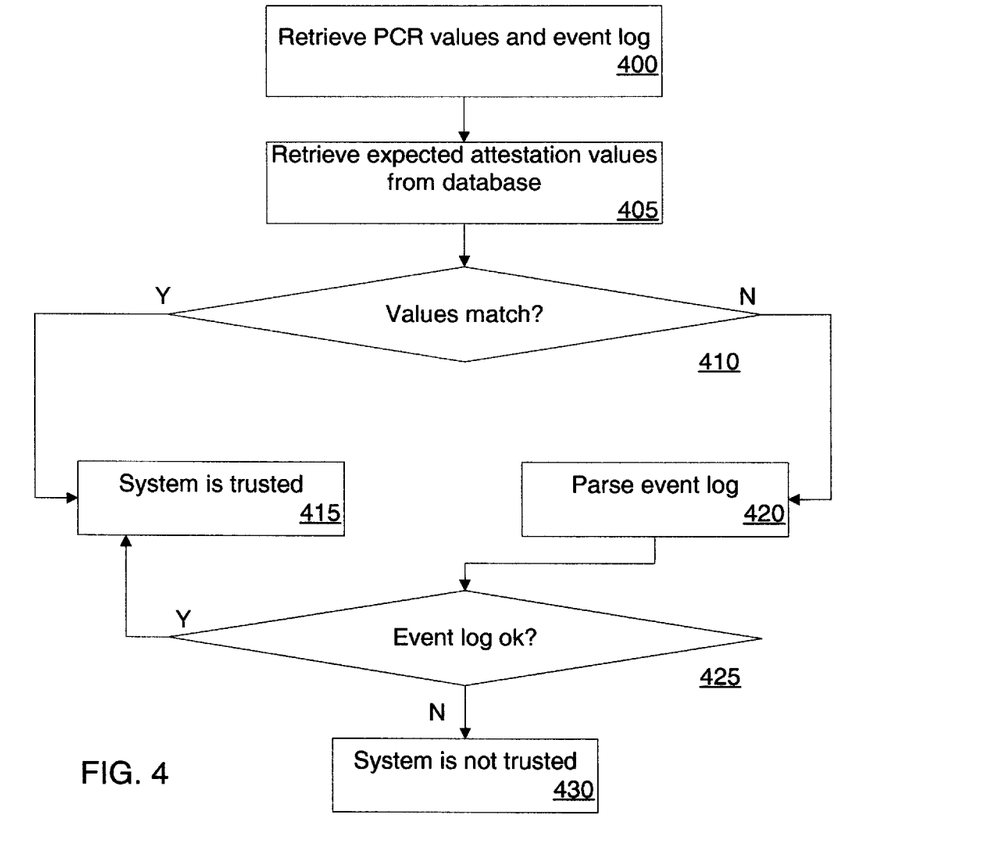
FIG. 4 is a flow chart showing the operational steps involved in a known remote attestation process.

A simplified example of an attestation process performed on the managing system (305) will now be described with reference to FIG. 4.

At step 400, the received current PCR values (230) together with the event log (235) are retrieved. At step 405, expected attestation values associated with components of the managed system (200) are retrieved from a database (325). At step 410, an emulator (310) of the managing system (305) compares the received current PCR values (230) with the expected attestation values. It should be understood that a number of other components of the managing system (305) could execute the comparison logic.

If a match occurs for each PCR value, the managed system (200) is considered to be trusted (step 415) and no further work is done.

If a match does not occur for each PCR value, the managing system (305) parses (step 420) the event log (235), inspecting each entry in turn to decide whether or not measurement value(s) contained in an entry associated with a measured component in question is valid.

If each event log (235) entry appears to be valid (positive result to step 425), the managed system (200) is considered to be trusted (step 415) and no further work is done.

If the event log entry appears not to be valid (negative result to step 425), the managed system (200) is not considered to be trusted (step 430)—preferably, a security alert is raised before moving to a "System untrusted" exit state.

An example implementation of the above process will now be described.

Typically, manufacturers of components of the managed system (200) provide a (large) list (e.g., a reference manifest) of measurement values associated with a component—these measurement values can be taken to be "trusted". Further, typically, the trusted boot process is highly deterministic and associated events which appear in the event log (235) follow a strict pattern. In an example where the CRTM (220) measures the firmware (215) which in turn measures the operating system (210), the event log (235) typically comprises two events, namely, "firmware measured" and "operating system measured". Even if the firmware (215) and/or the operating system (210) are changed (e.g., updated), during a future boot process, the same two events will occur in the same order and only the associated measurement values will differ.

In an example, each measurement value is associated with the same PCR. In the example, the managing system (305) keeps a record indicating that the last time the managed system (200) booted, it was using firmware, e.g., having version X with a measurement of M1 and an operating system, e.g., having version Y with a measurement of M2, where M1 and M2 are SHA digests of the firmware boot component and operating system boot component respectively. The two events together with the measurement values, namely, "firmware measured: SHA(M1)" and "operating system measured: SHA(M2)", when extended into a PCR, give a current PCR value of "Z". The current PCR value of "Z" is recorded as an expected attestation value for the firmware (215) and the operating system (210) in the database (325) of the managing system (305).

During a subsequent attestation process, the managing system (305) retrieves (step 400) the received current PCR values (230) together with the event log (235) and retrieves (step 405) the expected attestation values from the database (325).

At step 410, the emulator (310) compares the values of the received current PCR values with the expected attestation values—if a match occurs, it is determined (step 415) that the managed system (200) is using the expected firmware (215) and operating system (210).

If a match does not occur, (i.e., the received current PCR value is not "Z"), the managing system (305) parses (step 420) the event log (235) to find associated entries. The managing system (305) compares the first event and measurement value, namely, "firmware measured: SHA(M1)" with a list of trusted values provided by the particular manufacturer of the firmware and compares the second event and measurement value, namely, "operating system measured: SHA(M2)" with a list of trusted values provided by the particular manufacturer of the operating system.

If either component has a measurement value which the manufacturer has not listed as "trusted", the managed system (200) is assumed (step 430) to be compromised.

If both components have a measurement value which the manufacturer has listed as "trusted", the managed system (200) is assumed (step 415) to be trusted and the measurement values can be associated with a new expected attestation value(s) that is used during the next attestation process of the managed system (200).

Figure 5:
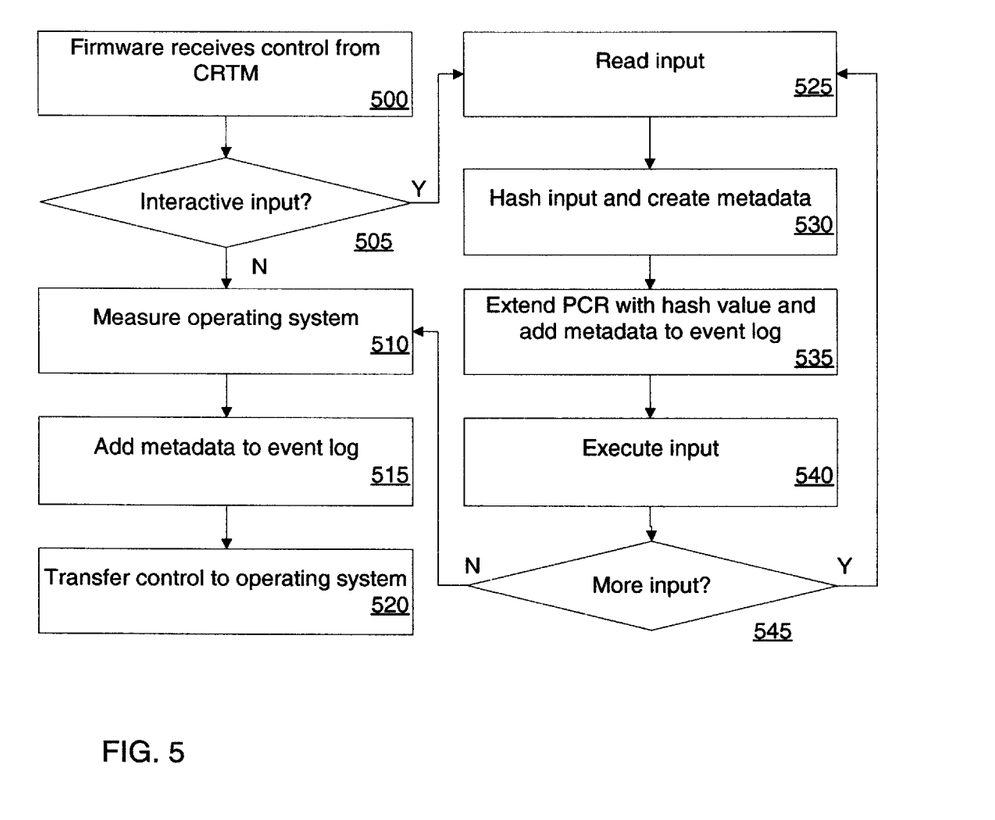
FIG. 5 is a flow chart showing the operational steps involved in a trusted boor process according to an embodiment.
Figure 6:
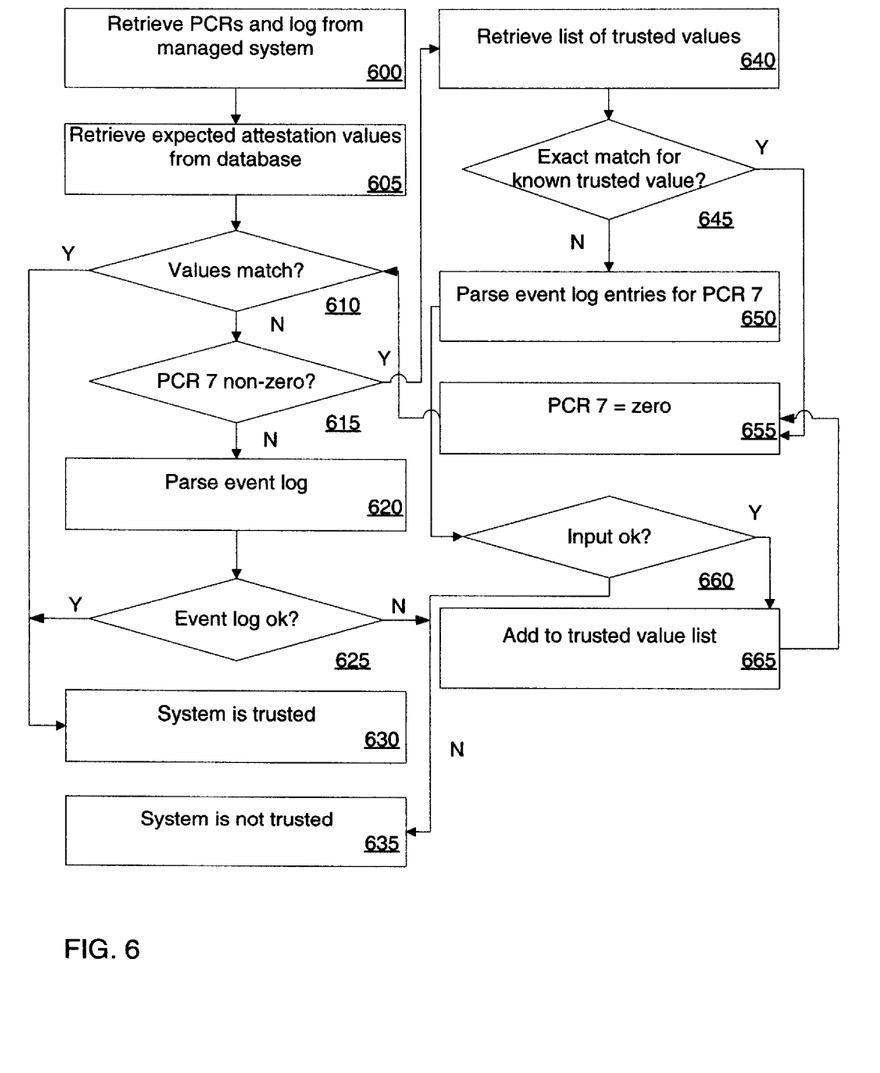
FIG. 6 is a flow chart showing the operational steps involved in a remote attestation process according to an embodiment.

Trusted boot and remote attestation processes for supporting interactive components, will now be described with reference to FIG. 5 and FIG. 6.

Preferably, a PCR (e.g., "7") is reserved for receiving measurement values associated with a user's input (e.g., key strokes) to an interactive component. The PCR (7) is typically expected to have an initial "power-on" state (e.g. zero) as any other value indicates that an interactive component has been used.

A method of capturing values associated with input when use of an interactive component occurs, will now be described with reference to FIG. 5.

At step 500, for example, the firmware (215) receives control from the CRTM (220). If the boot process is not diverted to an interactive component (negative result to step 505), the firmware (215) measures (step 510) the next component in the trusted boot process (e.g., the operating system (210)). The measurement value is extended into a PCR by the firmware (215), associated metadata is added (step 515) to the event log (235) by the firmware (215) and control is transferred (step 520) to the operating system (210).

If the trusted boot process is diverted to an interactive component (positive result to step 505), at step 525, the firmware (215) reads the input (e.g., keystrokes; a menu choice; commands) entered by the user. The firmware (215) hashes (step 530) each input (e.g., hashing of individual characters or hashing each discrete sequence) and creates (step 530) metadata associated with the input (e.g., identifier of input; type of input). PCR (7) is extended (step 535) with the hash value by the firmware (215) and the metadata is added (step 535) to the event log (235) by the firmware (215).

At step 540, the input (e.g., particular keystrokes) is executed and subsequently, a determination is made (step 545) as to whether any further input has been entered. If further input has been entered, the process passes to step 525. If further input has not been entered, the process passes to step 510, whereby the firmware (215) measures the operating system (210).

Advantageously, PCR (7) can be extended to provide a unique hash value associated with input entered and further, associated metadata can be stored in the event log (235)—examples of input and associated hash values are shown in Table 1 below.

TABLE 1

| Input Metadata | Hash Value |
|---|---|
| printenv boot-device boot | 0xad16bf0a01821776a5515218fc |
| ls/dev/pci0/ boot | 0xf3129d3cb6fee7812abdfda104 |

Preferably, prior to use of the system present invention, a decision is made as to what input should be considered "trusted". For example, an administrator determines whether to accept a particular input (and thus, a particular hash value) as trusted (e.g., by using metadata associated with known input from other trusted systems). Preferably, an administrator can distribute a list of trusted hash values associated with input to other managing systems.

Note that in other implementations, the firmware (215) providing the interactive component may not be operable to use the event log (235) such that events associated with the input cannot be stored in the event log (235). Thus, e.g., the managing system (305) will not be able to determine the input that was entered on the managed system (200).

If this is the case, preferably, the administrator manually retrieves the input (e.g., in a batch), asynchronously to the boot process. Alternatively, the administrator can contact users of the managed system (200) to request the input that the users intend to use during the boot process. The administrator determines whether to accept a particular input as trusted (e.g., by using metadata associated with known input from other trusted systems) and uses the emulator (310) of the managing system (305) to calculate trusted hash values for the input.

A remote attestation process will now be described with reference to FIG. 6.

At step 600, the current PCR values (230) together with the event log (235) are retrieved. At step 605, expected attestation values are retrieved from the database (325). At step 610, the emulator (310) of the managing system (305) compares the received current PCR values (230) with the expected attestation values.

If a match occurs for each PCR value, the managed system (200) is considered to be trusted (step 630) and no further work is done.

If a match does not occur for each PCR value, a check is made at step 615 to determine whether the PCR (7) value is non-zero.

If the PCR (7) value is not non-zero (indicating no use of an interactive component), the managing system (305) parses (step 620) the event log (235) by inspecting each entry in turn (with reference to the reference manifest) to decide whether or not a measured component in question is valid (an implementation is described above with reference to FIG. 4).

If each event log entry appears to be valid (positive result to step 625), the managed system (200) is considered to be trusted (step 630) and no further work is done.

If an event log entry appears not to be valid (negative result to step 625), the managed system (200) is not considered to be trusted (step 635).

If the PCR (7) value is non-zero (indicating use of an interactive component), trusted hash values associated with input are retrieved (step 640) and the PCR (7) value is compared (step 645) with the trusted hash values.

If the PCR (7) value matches any of the trusted hash values, PCR (7) is set (step 655) to zero and the value comparison logic (step 610) is retried in case any other PCR values also differed.

If at step 645, it is determined that the PCR (7) value did not match any of the trusted hash values, the event log (235) is used (step 650) to analyse the metadata associated with the input (e.g., to determine what particular key strokes or menu choices have been used). This is a much simpler process than parsing of the entire event log (235) as only the events for PCR (7) need to be read.

At step 660, a determination is made as to whether the input can be trusted. For example, the determination is made by checking the input against a known list of untrusted input or a known list of trusted input.

For example, a strict policy associated with the managed system (200) may demand that an interactive command prompt is never used and only menu navigation is valid. In such a case, the trusted input would comprise, e.g., a set of keystrokes that do not lead to an invocation of the interactive command prompt. For example, if the invocation of the interactive command prompt occurs by using the numerical character "9", if the metadata is associated with keystrokes other than the numerical character "9", at step 660, the input is determined to be trusted.

In another example, a less strict policy associated with the managed system (200) may permit use of an interactive command prompt provided that the user never attempts to write values to memory. If values are typically stored in memory using the "!" character and if the metadata is not associated with the "!" character", at step 660, the input is determined to be trusted.

If a determination is made that the input can be trusted, the measurement value of input associated with PCR (7) is added (step 665) to the list of trusted hash values—thus, in the future, uses of the particular input will not unnecessarily raise an alert. Subsequently, PCR (7) is set (step 655) to zero and the value comparison logic (step 610) is retried in case any other PCR values also differed.

If a determination is made that the input can not be trusted, the managed system (200) is considered untrusted (step 635).

It will be clear to one of ordinary skill in the art that all or part of the method may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An alternative embodiment be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. A method for attesting a boot process of a managed system, said managed system having an interactive component for receiving an optional interactive user input as part of the boot process, the method comprising the computer-executed steps of:

retrieving a record of events occurring during said boot process, the record of events being generated in said managed system during said boot process;

determining, using said record of events, whether an interactive user input was received in said managed system using said interactive component as part of said boot process;

in response to determining that an interactive user input was received in said managed system using said interactive component:

comparing a cryptographic value derived from the interactive user input with a record of any trusted cryptographic values to determine whether the interactive user input which was received using said interactive component as part of said boot process should be trusted;

if the cryptographic value derived from the interactive user input matches a trusted cryptographic value in the record of any trusted cryptographic values, then determining that the interactive user input should be trusted;

if the cryptographic value derived from the interactive user input does not match any trusted cryptographic value in the record of any trusted cryptographic values, then parsing an event log containing the interactive user input to determine whether the interactive user input should be trusted; and         in response to determining that the interactive user input should be trusted as a result of parsing the event log containing the interactive user input to determine whether the interactive user input should be trusted, processing the interactive user input to create a first trusted cryptographic value and adding the first trusted cryptographic value to the record of any trusted cryptographic values.

2. A method as claimed in claim 1, further comprising the steps of:

assigning a platform configuration register (PCR) to the interactive user input; and     extending the assigned PCR with the interactive user input.

3. A method as claimed in claim 1, further comprising the step of:

generating metadata associated with the trusted cryptographic value.

4. A method as claimed in claim 1, further comprising the step of:

determining, in response to the subsequent interactive user input matching a trusted cryptographic value, that a system associated with the interactive component is trusted.

5. A method as claimed in claim 1, wherein parsing an event log containing the interactive user input to determine whether the interactive user input should be trusted comprises:

matching an event log entry in the event log with a data structure of known input.

6. A method as claimed in claim 5, further comprising the step of:

determining, in response to the event log entry not matching the data structure of known input, that a system associated with the interactive component is not trusted.

7. A method as claimed in claim 1, wherein the method is performed in a managing computer system separate from said managed computer system.

8. A computer program comprising computer program code stored on a non-transitory computer readable medium to, when loaded into a computer system and executed thereon, cause said computer system to perform the steps of:

retrieving a record of events occurring during a boot process of a managed system, said managed system having an interactive component for receiving an optional interactive user input as part of the boot process, the record of events being generated in said managed system during said boot process;

determining, using said record of events whether an interactive user in gut was received in said managed system using said interactive component as part of said boot process;

in response to determining that an interactive user input was received in said managed system using said interactive component;

comparing a cryptographic value derived from the interactive user input with a record of any trusted cryptographic values to determine whether the interactive user input which was received using said interactive component as part of said boot process should be trusted;

if the cryptographic value derived from the interactive user input matches a trusted cryptographic value in the record of any trusted cryptographic values, then determining that the interactive user input should be trusted;

if the cryptographic value derived from the interactive user input does not match any trusted cryptographic value in the record of any trusted cryptographic values, then parsing an event log containing the interactive user input to determine whether the interactive user input should be trusted; and         in response to determining that the interactive user input should be trusted as a result of parsing the event log containing the interactive user input to determine whether the interactive user input should be trusted, processing the interactive user input to create a first trusted cryptographic value and adding the first trusted cryptographic value to the record of any trusted cryptographic values.

9. The computer program as claimed in claim 8, wherein the computer program code is executed in a managing computer system separate from said managed computer system.

* * * * *